United States Patent [19]
Feraboli

[11] Patent Number: 5,524,862
[45] Date of Patent: Jun. 11, 1996

[54] MIXER VALVES WITH ELECTRONIC CONTROL

[75] Inventor: Enrico Feraboli, Brescia, Italy

[73] Assignee: Sol S.p.A., Brescia, Italy

[21] Appl. No.: 215,907

[22] Filed: Mar. 22, 1994

[30] Foreign Application Priority Data

Mar. 23, 1993 [IT] Italy ................... BS93A0024

[51] Int. Cl.⁶ ............. F16K 31/128; F16K 31/145; F16K 31/42
[52] U.S. Cl. ............ 251/30.02; 137/607; 251/30.05; 251/45; 251/61.1; 251/61.4; 251/129.03; 251/129.04
[58] Field of Search ............. 251/5, 30.02, 30.05, 251/45, 46, 61.1, 129.04, 61.4, 129.03; 137/607

[56] References Cited

U.S. PATENT DOCUMENTS

| | | | |
|---|---|---|---|
| 2,336,450 | 12/1943 | Voorhess et al. | 251/61.1 |
| 3,118,646 | 1/1964 | Markey | 251/30.05 |
| 3,145,967 | 8/1964 | Gardner | 251/30.05 |
| 3,282,556 | 11/1966 | Hancock | 251/45 |
| 3,685,788 | 8/1972 | Bloomfield | 251/61.1 |
| 3,854,694 | 12/1974 | Coone | 251/5 |
| 3,884,261 | 5/1975 | Clynch | 251/61.1 |
| 4,186,764 | 2/1980 | Ottersen et al. | 137/451 |
| 4,210,310 | 7/1980 | Kay | 251/61.1 |
| 4,603,832 | 8/1986 | Sjoquist | 251/30.02 |
| 4,793,588 | 12/1988 | Laverty, Jr. | 25/30.05 |
| 4,925,153 | 5/1990 | Romer | 251/45 |
| 5,050,641 | 9/1991 | Shwu-fen | 251/129.04 |
| 5,156,187 | 10/1992 | Schmidt et al. | 251/30.02 |
| 5,244,179 | 9/1993 | Wilson | 251/30.05 |

*Primary Examiner*—George L. Walton
*Attorney, Agent, or Firm*—McGlew and Tuttle

[57] ABSTRACT

The present invention pertains to a mixer valve with electronic control, which incorporates a group of valves (27) arranged in a housing (26) provided in the valve body axially to the coupling (22) which defines the water outlet duct towards the supply mouth. The group of valves consists of a diaphragm valve (30), which is made of an elastic material and essentially has the shape of a small bowl, arranged at the level of a valve seat (32) on the inside of the outlet duct (21), and the group consists of a stop valve (31) which is controlled by an electromagnet (29). The diaphragm valve (30) delimits an internal chamber (35), which communicates, from one component (A), with a mixed water supply duct (24), and from another component (B), with an outlet port (C) which is connected to the drain duct (21) and which is opened and closed by the stop valve. The diaphragm valve (30) is capable of expanding and contracting radially as a function of the differences between the pressures on the inside and on the outside of the chamber and as a result of the closing and opening of the outlet port by the stop valve.

17 Claims, 8 Drawing Sheets

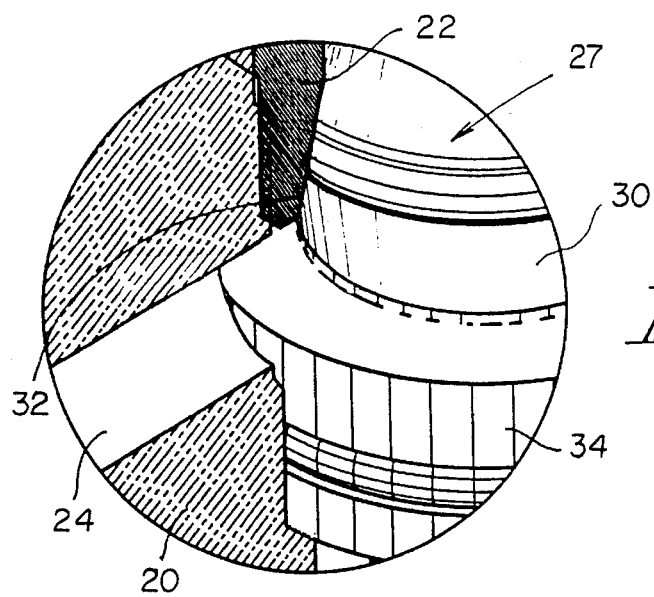
Fig.2
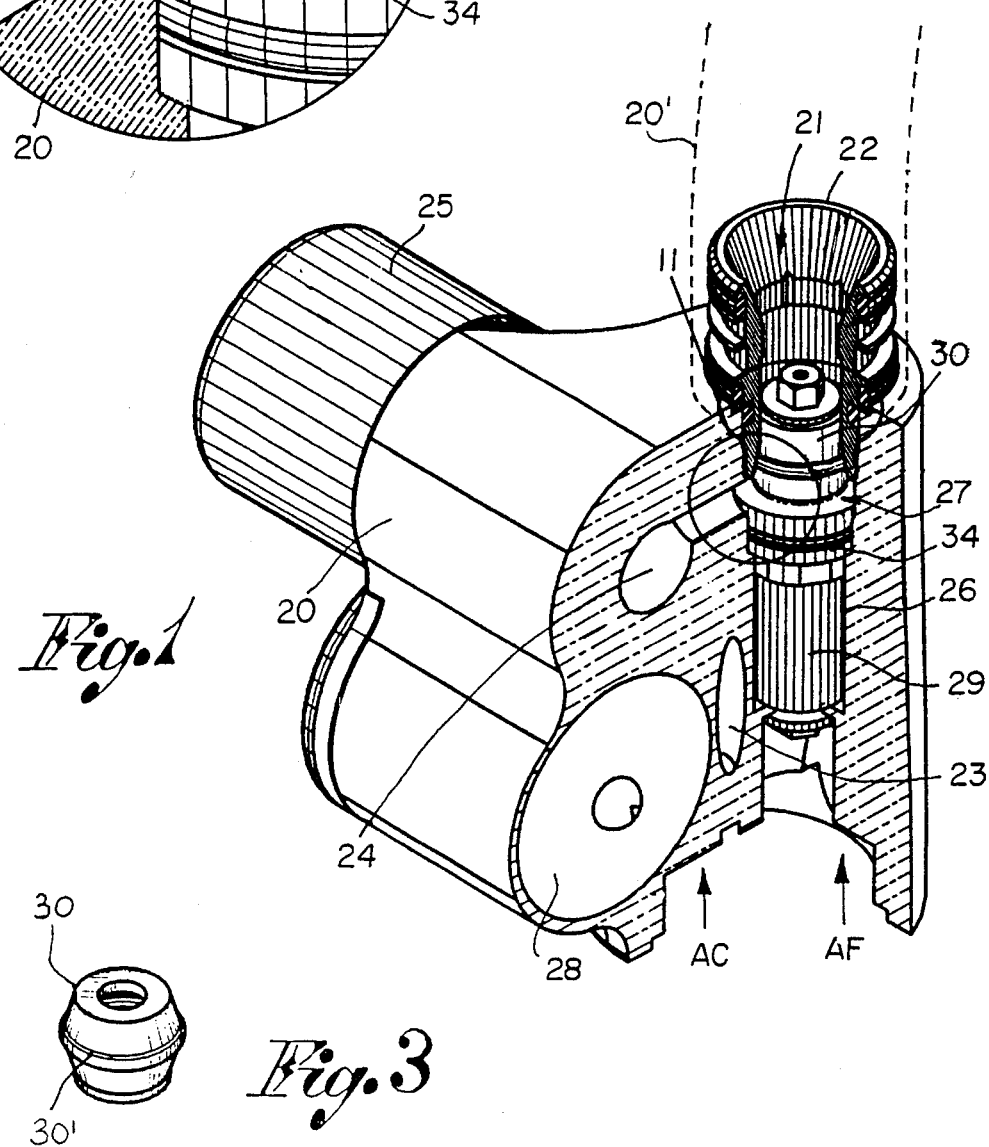
Fig.1
Fig.3

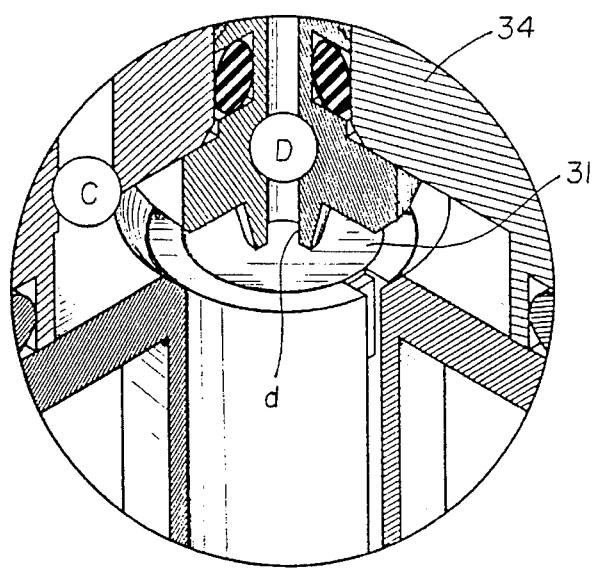
Fig.4b
Fig.4a
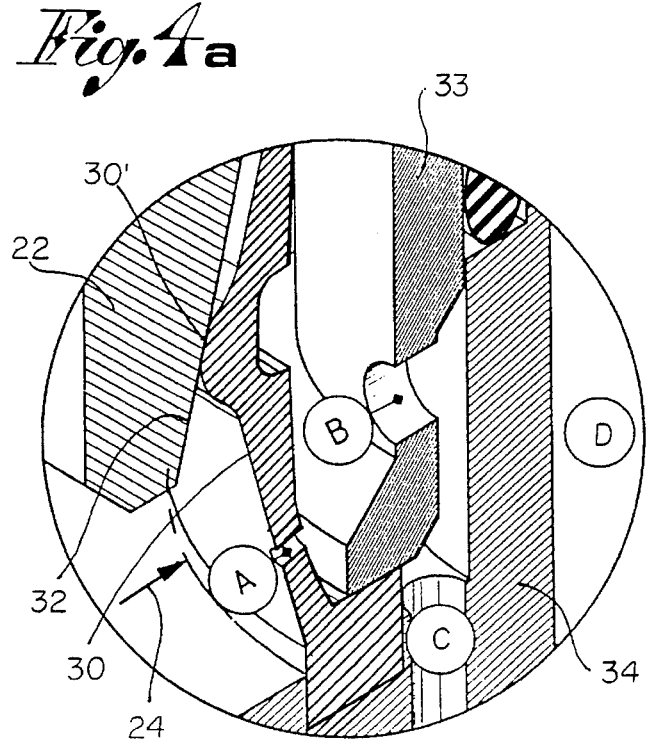
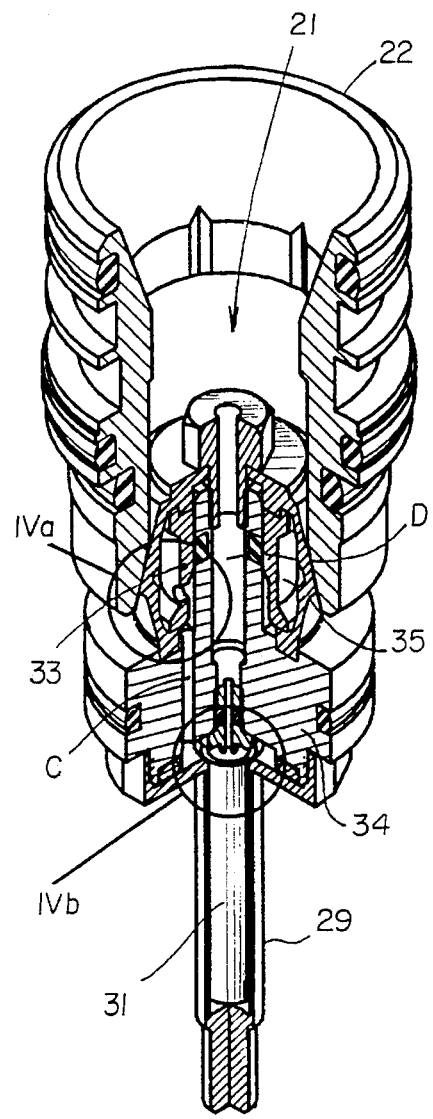
Fig.4

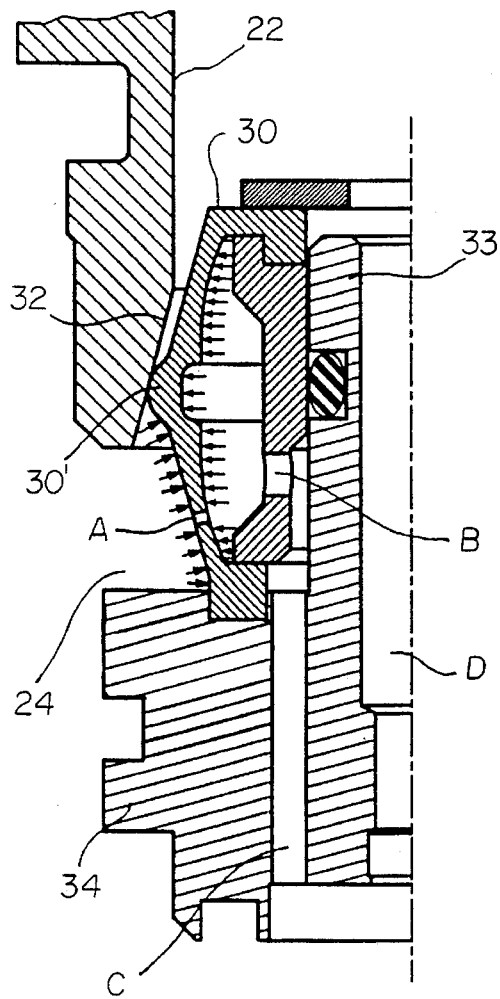
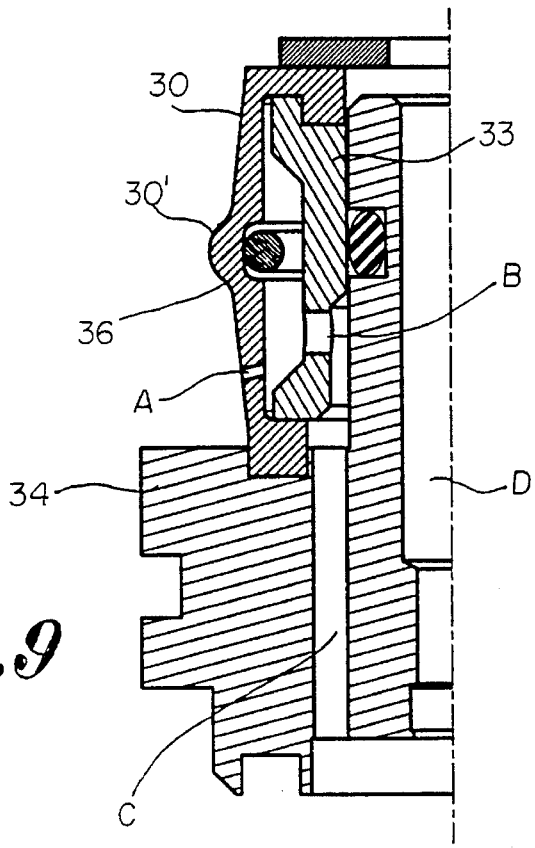

MIXER VALVES WITH ELECTRONIC CONTROL

FIELD OF THE INVENTION

The present invention pertains to hot and cold water mixer valves for hygiene and sanitation units, and more specifically, it concerns improvements made to mixer valves with electronic control, especially to a group of valves which, when actuated by an electromagnet, control the opening/closing of the outlet passage of the water towards the mouth of the valve.

BACKGROUND OF THE INVENTION

Valve components in the form of a disc or washer, whose arrangement in the valve body and whose actuation by an electromagnet are always problematic, are usually used in the prior-art mixer valves with electronic control. In fact, the adoption of valve means of the type used here involves considerable obstacles and significant problems both due to the complexity of the channels to be made in the valve body and due to the dimensions that the valve components must have in order to be able to ensure the desired water flows. The presence of these valve components also frequently places conditions on the shapes and the sizes of the electronic valves; in fact, in order not to go beyond certain limits imposed by the requirements of installation and/or aesthetics, recourse is often made to the arrangement of the electronic control component at a distance from the valve with the need, therefore, for connecting wires.

SUMMARY AND OBJECTS OF THE INVENTION

On the other hand, the present invention is focused on finding a solution for the drawbacks and on solving the problems of the current electronic valves by means of a new, original diaphragm valve structure, an arrangement of this valve in a more convenient and easy position on the inside of the valve body as well as a housing of the electronic control component directly in the valve body, including power supply batteries.

Advantageously, the diaphragm valve has the configuration of a small bowl and is able to expand and to contract radially as a function of the differences in the pressures on the inside and on the outside of the diaphragm valve. In other words, the diaphragm valve exercises its opening/closing function of a valve seat with radial action with one of its intermediate peripheral zones, which makes it possible to establish, when opened, a passage of water with a rim having a large cross section in order to fully meet the flow requirements of the valve as well, keeping the dimensions of the valve relatively reduced.

Also advantageously, the diaphragm valve and the electromagnet for its control are placed axially to the water outlet duct to the mouth of the valve, arrangements which, in addition to the reduced dimensions of the valve, make it possible to limit the volumes of the valve body, to more readily mold its shapes and dimensions for a more appreciable aesthetic effect, and also to accommodate the layout of the electronic control component and the electric power supply in the valve body.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective view of an electronic mixer valve of the present invention which is cut in a sectional view to show the arrangement of the valve;

FIG. 2 shows an enlarged detail corresponding to the circled section II in FIG. 1;

FIG. 3 shows the only diaphragm of the on-off valve:

FIG. 4 shows, in perspective view, a cross section of the on-off valve with closed stop valve;

FIGS. 4a and 4b show two enlarged details of FIG. 4 corresponding to the circled sections IVa and IVb, respectively;

FIG. 8 shows, in a cross-sectional view, the valve diaphragm in the closed position, and with the arrows, the distribution of the internal and external pressures on the diaphragm in such a position;

FIG. 9 shows a section of the diaphragm with an inner elastic pre-stress ring;

DETAILED DESCRIPTION OF THE PREFERRED EMBODIMENT

Figure 5:
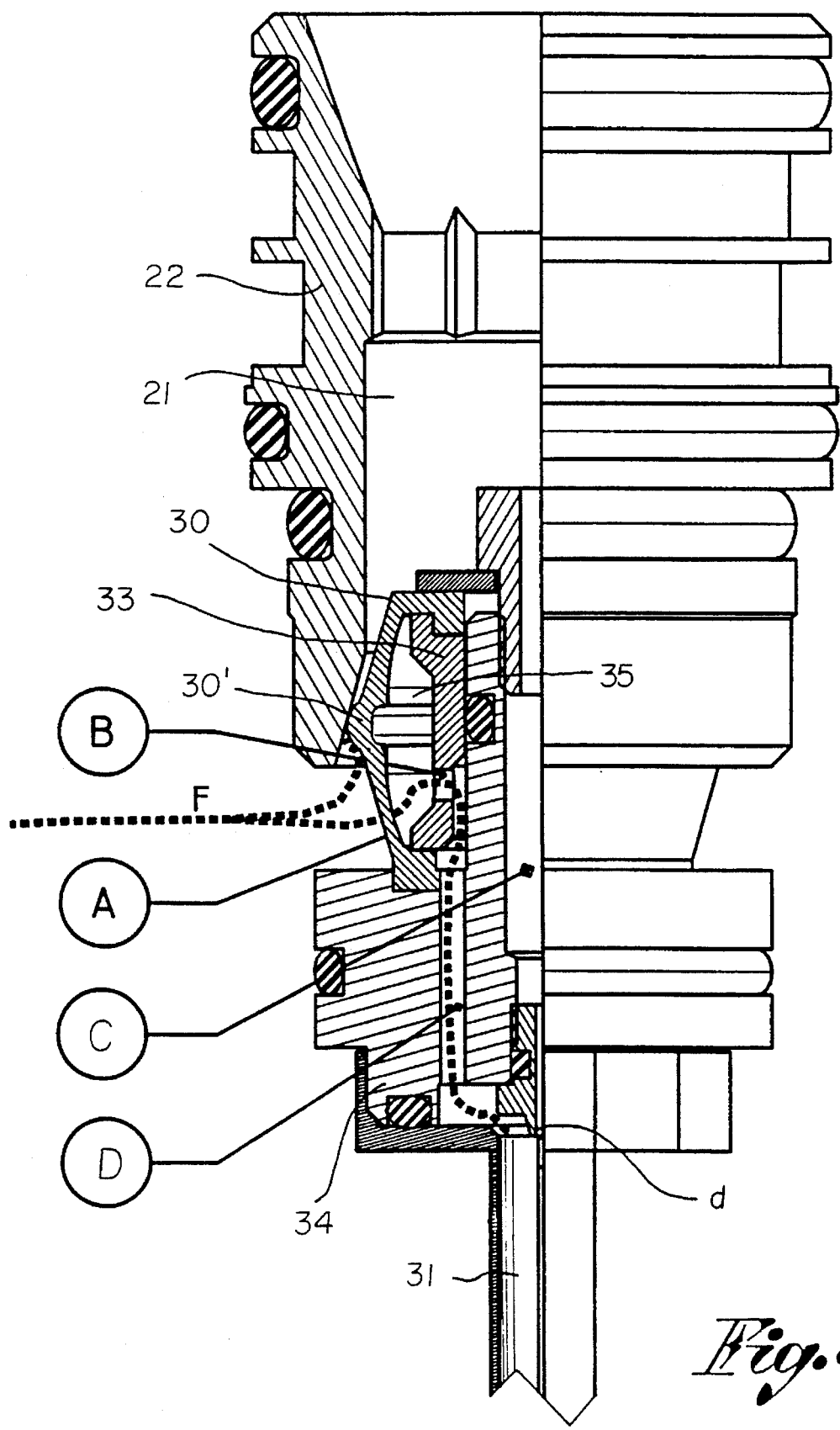
FIG. 5 shows a partial longitudinal section of the closed valve as in FIG. 4.
Figure 6A:
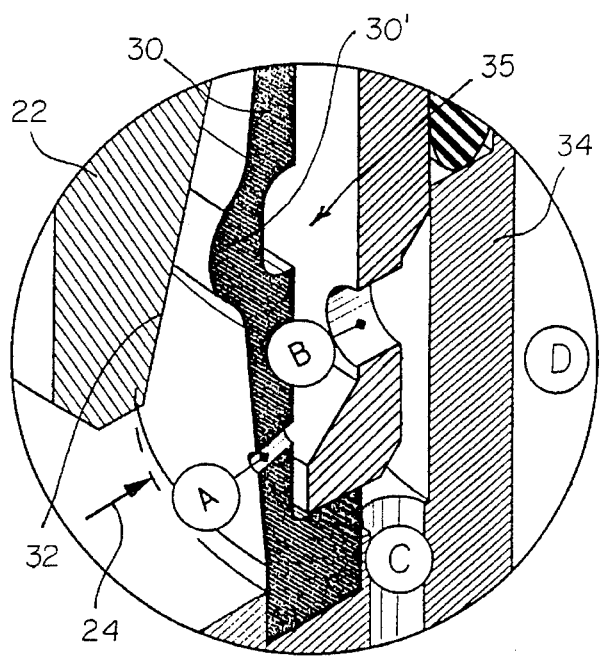
FIGS. 6a and 6b show two enlarged details of FIG. 6 corresponding to the circled sections VIa and VIb, respectively.
Figure 6B:
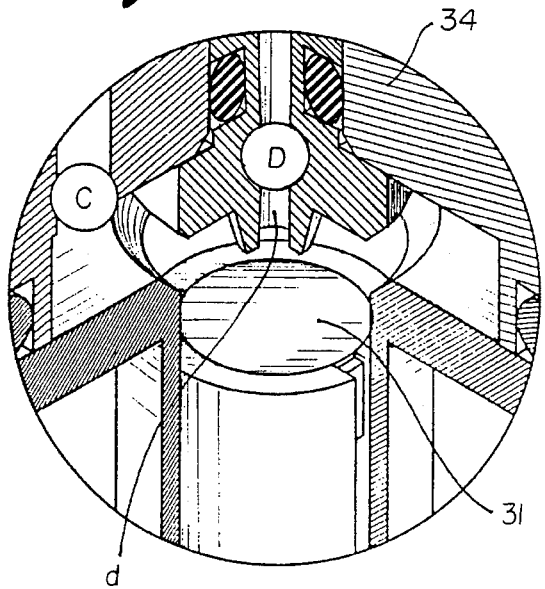
Figure 6:
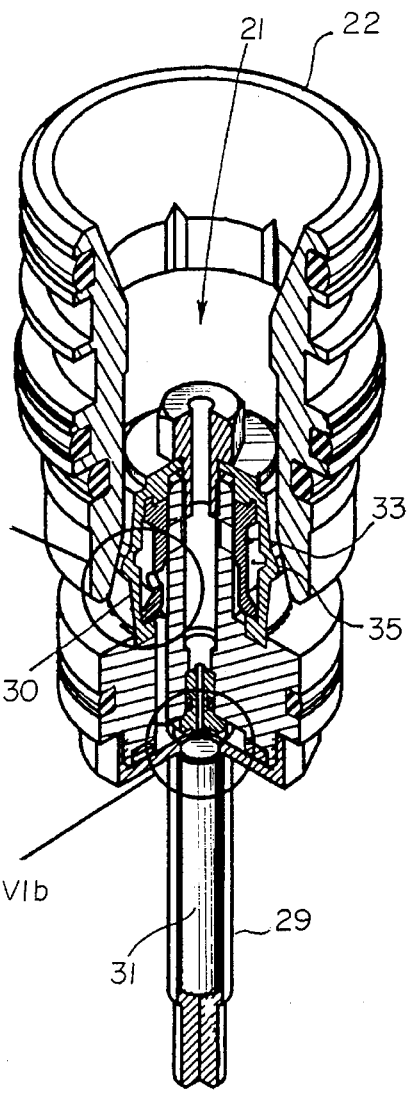
FIG. 6 shows a cross section as in FIG. 4, but with the stop valve of the valve open.
Figure 7:
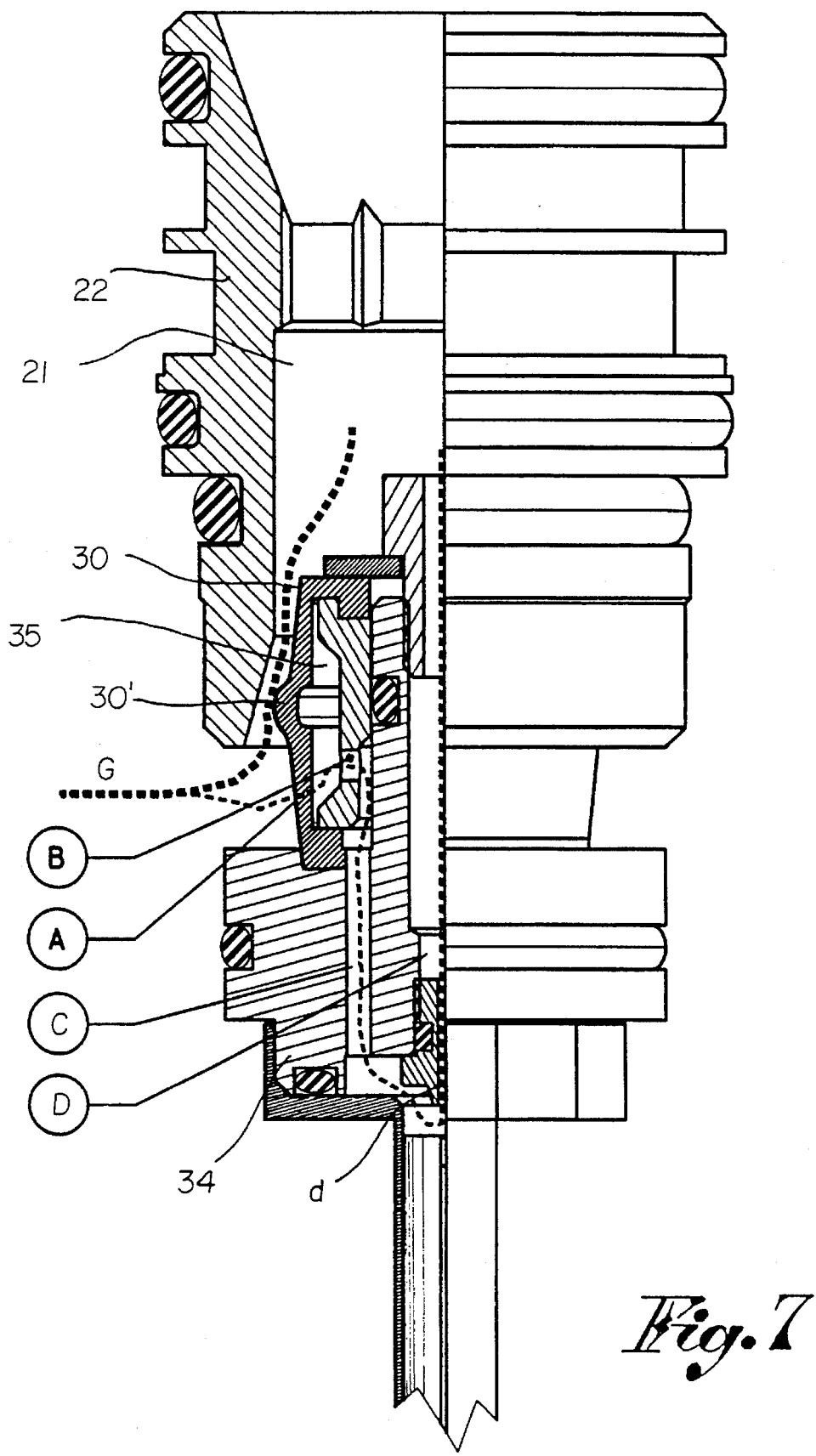
FIG. 7 shows a partial longitudinal section of the open valve as in FIG. 6.

In FIGS. 1 and 2 of the drawings, 20 globally indicates a mixer valve body partially in cross section. The mixer valve body has, in the known manner, hot and cold water inlet ducts, which are arranged in the directions of the arrows AC and AF in FIG. 1, and it is provided with a supply mouth 20' which is mounted downstream of a water outlet duct 21 which is defined by a coupling 22 attached to the valve body 20. Of the water inlet ducts, only one appears in FIG. 1 and is indicated as 23. The valve body 20 is also provided with a mixed water supply duct 24 to the outlet duct 21, a knob 25 for regulating the flow of water through the supply duct 24, an on/off housing 26 for a group of valves 27 which regulates the opening/closing of the water outlet duct 21, and an electronic housing 28 for the electronic component which controls the group of valves for opening/closing the valve.

This electronic component is known per se and does not merit particular attention here. It should only be noted that the electronic component controls the group of valves 27 by means of a control electromagnet 29.

The on/off housing 26 for the group of valves 27 in the valve body 20 is placed axially to the water outlet duct 21, and the electromagnet 29 is placed axially below the group of valves.

The group of valves 27 essentially consists of two components: a diaphragm valve 30 and a stop valve 31 with linear adjustments. The diaphragm valve 30 is made of an elastic material, such as rubber, and has essentially the shape of a partial sphere or of a small bowl, which can expand and contract radially, and it is placed flush with a valve seat 32 provided in the coupling 22 which defines the water outlet duct 21 towards the supply mouth. The diaphragm 30 is provided with a fixed internal element 33, which, in turn, is provided with a support coupling 34 which delimits an axial drain port D in line and in communication with the outlet duct 21.

On its lower end, the duct D has an input port d which is closed and opened by the stop valve 31, whose adjustments in the closing and opening positions are controlled by the electromagnet 29, which is controlled by the electronic component of the valve 20.

The diaphragm 30, with the internal element 33 that supports it, delimits a chamber 35 which, on the one hand, continuously communicates, through a small radial supply port A provided in the diaphragm, with the mixed water supply duct 24, and on the other hand, through a radial port B provided in the internal element 33, with an outlet port C which extends into the support coupling 34 in parallel to the axial drain port D and which is opened towards the bottom to communicate with the input port d of the drain port D only when the stop valve 31 is in the opened position.

The diaphragm valve 30 has an intermediate annular component 30' above the small port A and is intended to rest with a slight pre-stress on the valve seat 32 when the diaphragm is expanded so as to close the passage of water from the supply duct 24 to the outlet duct 21. On the other hand, when the diaphragm is contracted, its intermediate annular component 30' is moved away from the valve seat 32, thus opening the direct passage of water from the supply duct 24 to the outlet duct 21 for a normal supply.

The expansion and the contraction of the diaphragm results from the differences between the pressures on the inside and on the outside of the diaphragm, which are created with the opening and closing of the input port d of the drain port D by the stop valve 31. Of course, the diaphragm expands and begins to close when the internal pressure is greater than the external pressure (see FIG. 8).

The expansion of the diaphragm 30 can, moreover, be assisted by an elastic loading ring 36 arranged on the inside of the diaphragm itself at the level of its intermediate collar 30' as in FIG. 9.

For further details, the operation of the group of valves is illustrated below under the conditions of closed valve and open valve, with particular reference made to the ports A, B, C, D, to the diaphragm valve 30, and to the stop valve 31 which is controlled by the electromagnet. The closed valve condition is shown in FIGS. 4, 4a, 4b, 5 and 8.

As stated above, the diaphragm 30, made of elastic material, that is, rubber, is designed to expand, close the valve seat 32 with a slight pre-stress and to block the water outlet duct 21. The small port A always puts the supply duct 24 in communication with the chamber 35 on the inside of the diaphragm, which also means that, thanks to the small port A, there is always a direct connection between the duct 24, the port B, and the outlet duct C.

When the stop valve 31 which is controlled by the electromagnet 29 is closed on the inlet d of the drain port D, the passage of water into this port is blocked. The ports A, B, C and the chamber 35 on the inside of the diaphragm 30 fill up with water, and the pressure in the chamber is equal to that of the water fed in. The dotted lines F in FIG. 5 indicate the zones with the presence of water.

The condition of closing is maintained by the fact that (see FIG. 8):

on the outside, the pressure of the water acts only on a part of the surface of the diaphragm below the intermediate closing collar 30', causing a compression action which tends to remove the diaphragm from the valve seat;

on the inside of the chamber 35, however, the water pressure acts on the entire surface of the diaphragm with an action tending to expand the diaphragm against the valve seat.

Since the inner wet surface is greater than the outer wet surface of the diaphragm, a difference in force is produced which confirms the closing of the valve, blocking the passage of water towards the mouth of the valve through the outlet duct.

It is immediately evident why the water must never pass through the small port A instead of deforming the diaphragm and exiting from the mouth. However, it must be recalled that the smallest flow is involved, and then it must be pointed out, even if banally, that only one drop of water, which is added to the water present on the inside of the diaphragm, increases the content and thus the possibility that a "second drop" enters the duct A instead of exiting from the mouth until reaching the balance of the pressures.

The entire unit would not function if the diaphragm did not have a prestress which held it slightly forced against the outlet duct in order This pre-stress can be produced by the internal reaction that is characteristic of the material forming the diaphragm which is forced against the valve seat on mounting and is favored by the particular geometry of the diaphragm or, as stated above, accentuated by means of the use of an elastic ring as is shown in FIG. 9.

The opened valve condition is shown in FIGS. 6, 6a, 6b, and 7.

When the stop valve 31 which is controlled by the electromagnet 29 is lowered, the port C and the port D are put into communication, with the water draining directly into the outlet duct where the outlet pressure, or atmospheric pressure, is thus clearly less than the inlet pressure.

In this situation, the water pressure in the port C, then in the port B, drops, and even if a small amount of water flows from the small port A, the pressure inside the membrane becomes much less than the external pressure. Therefore, the external pressure com- presses the diaphragm (the diaphragm flattens), and the water can flow towards the mouth. The zones that are wet with water and how the water flows to the outlet duct 21 passing around the diaphragm are shown with dotted lines in FIG. 7.

The entire unit would not function if the diameter of the beginning section of the port D were much smaller than the small port A. Load losses would be produced, which would lead to a high pressure on the inside of the diaphragm, and the operation of the diaphragm would become unstable. For this reason, the inlet port d of the axial port D is greater than the small radial port A of the diaphragm.

Finally, the different use of the areas inside and outside the diaphragm, which is made into a "small bowl", makes large flows with small radial dimensions possible, and thus, the diaphragm is particularly suitable for applications in the field of valves in general and to achieve the purposes of reducing the sizes and to be able to also arrange the electronic component and the batteries inside the body and to give the valve the available, desired shapes.

The stop valve 31 can be moved by an electromagnet as stated above or by a mechanical control drive.

Figure 10:
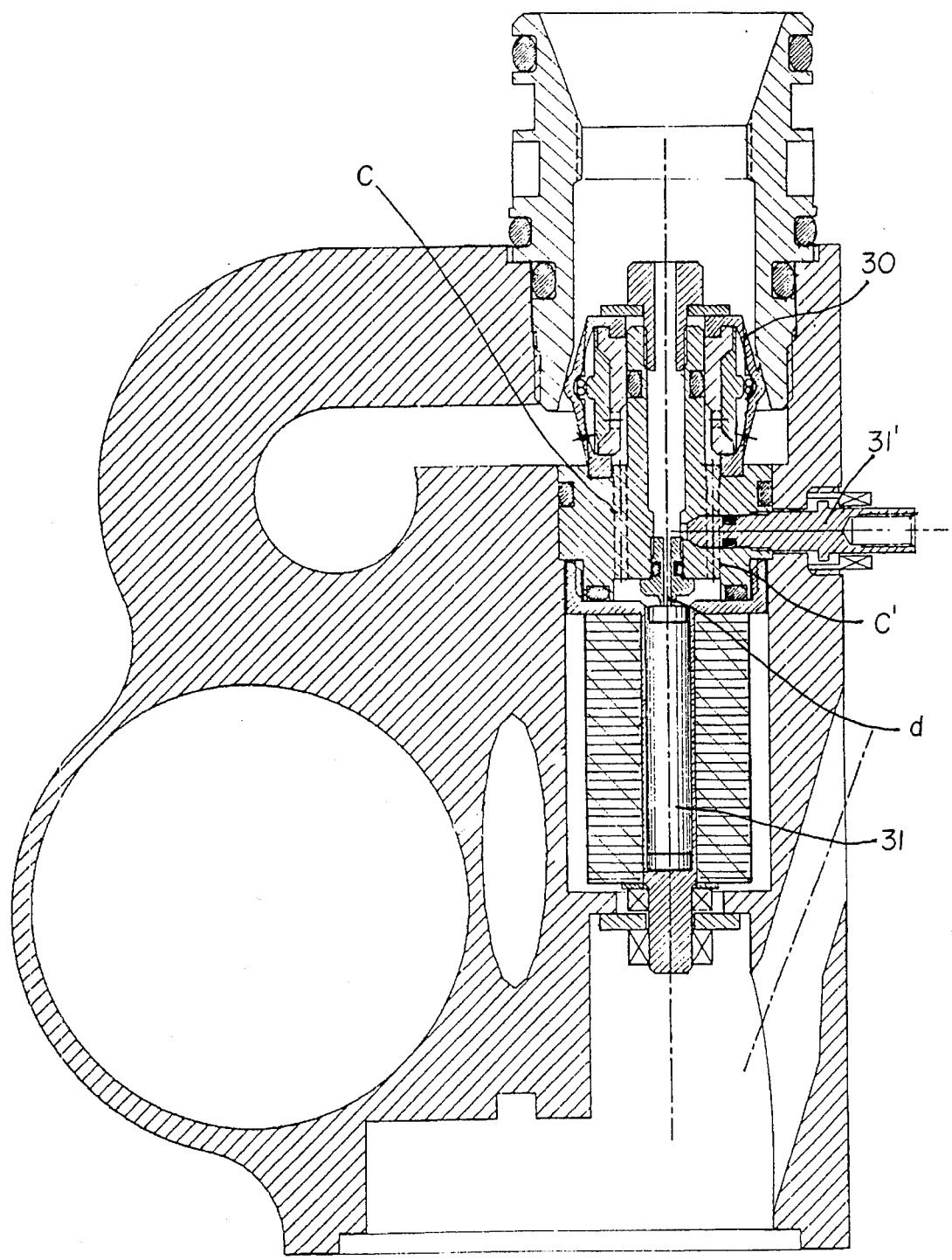
FIG. 10 shows a cross section of the complete automatic valve with a manual control as well.

In the support coupling, a second or another outlet port C' may also be provided (see FIG. 10), this port comes from the chamber 35 of the diaphragm 30 and which opens towards the inlet port of the drain port D, with a stop valve 31' being inserted along the second outlet port C'. This stop valve rotates or traverses with manual control, and which, when operated, permits a manual opening/closing of the valve in cases of emergency, independently, that is, of the electromagnet and in the absence of the electric power supply.

Figure 11:
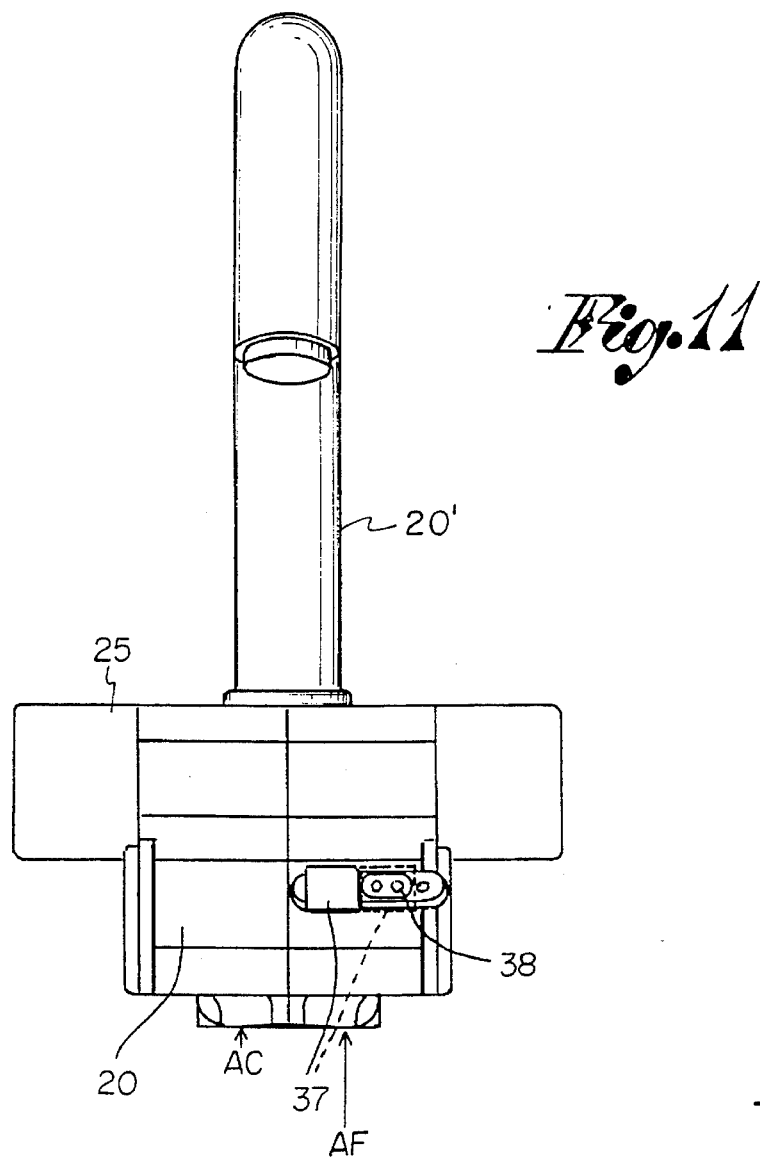
FIGS. 11 and 12 show a front view and a sectional view of the valve body with a slider facing the sensors which control the opening/closing of the valve.
Figure 12:
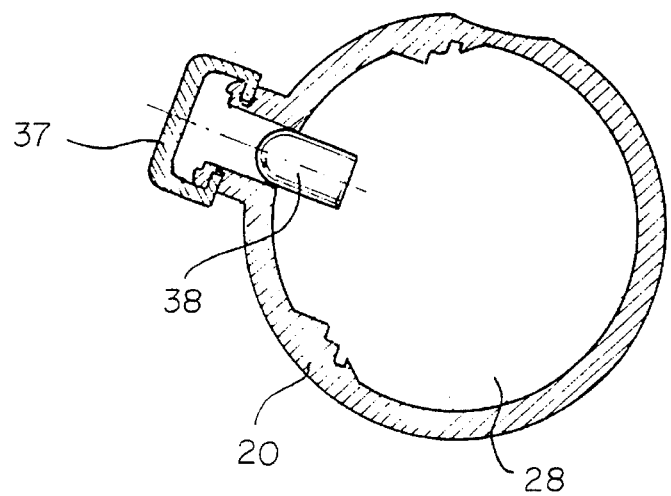

Finally, the valve (see FIGS. 11 and 12) may be provided with an adjustable slider means 37 at a distance from and in front of the sensors 38 so as to make it possible to use the valve with automatic control (when the slider is at a distance from the sensors) or to leave the valve open for prolonged periods of time without the presence of anything in front of the sensors (when the slider is placed in front of the sensors so as to reflect the signals).

What is claimed is:

1. An electronically controlled mixer valve comprising:

an on/off housing defining a radially extending supply duct and an annular outlet duct, the supply duct and outlet duct being in fluid communication with each other;

an internal mounting means positioned within said housing between said supply duct and said outlet duct;

an annular valve seat positioned at an outer radial surface of said outlet duct along a length thereof;

a diaphragm valve defining an inner radial surface of said outlet duct adjacent said valve seat, said diaphragm valve is secured to and surrounds said internal mounting means, said diaphragm valve being formed of an elastic material and with a shape capable of expanding and contracting said diaphragm valve to move an outer radial extending surface portion of said diaphragm valve against and away from an inner radial surface of said valve seat respectively in response to pressure differences between an inside and an outside of said shape, said diaphragm valve opening and closing communication between said supply duct and said outlet duct when said diaphragm valve is away from and against said valve seat respectively, said diaphragm valve defining an internal control chamber positioned coaxial with said outlet duct, said internal chamber communicating with said supply duct through a supply port at a location in said diaphragm valve;

an outlet port positioned in said mounting means and being in communication with said internal chamber;

a drain port positioned in said mounting means and being in communication with said outlet duct;

stop valve means positioned between said outlet port and said drain port, said stop valve means for opening and blocking communication between said outlet port and said drain port, said stop valve means blocking communication between said internal chamber and said drain port to expand said diaphragm valve against said valve seat and block communication between said supply duct and said outlet duct when said internal chamber is in fluid communication with said supply duct; and electromagnet means for controlling said stop valve.

2. A valve in accordance with claim 1, wherein:

said valve seat, said diaphragm valve, said stop valve means and said electromagnet means are positioned substantially axially with said outlet duct.

3. A valve in accordance with claim 1, wherein:

said diaphragm valve includes an intermediate collar which radially protrudes outward from said shape and contacts said valve seat when said diaphragm valve is against said valve seat, said diaphragm valve being pre-biased against said valve seat when said pressure differences between said inside and a said outside of said shape are substantially zero.

4. A valve in accordance with claim 1, wherein:

said diaphragm valve includes an elastic ring means for pre-biasing said diaphragm valve against said valve seat.

5. A valve in accordance with claim 1, wherein:

said outlet duct has an axial axis and has a supply mouth at one end substantially coaxial with said axial axis, for fluid exit from said on/off housing;

a support coupling is positioned coaxially with said axial axis of said outlet duct and defining said drain port substantially axially with said axial axis of said outlet duct, said drain port having a supply end opposite said stop valve means, said supply end of said drain port being positioned adjacent said supply mouth, said coaxial support coupling also defining said outlet port substantially axially with said outlet duct;

said mounting means includes a fixed internal element attached to said coaxial support coupling and said diaphragm valve, said diaphragm valve and said fixed internal element define said internal chamber, said diaphragm valve defines a radial opening as said supply port, said fixed internal element defines an opening communicating said internal chamber with said outlet port.

6. A valve in accordance with claim 5, wherein:

said drain port has an input port cooperating with said stop valve means, said supply port has a smaller cross section than said input port of said input port of said drain port.

7. A valve in accordance with claim 5, wherein:

a fluid exit direction from said on/off housing, said valve seat, said diaphragm valve, said stop valve means, said outlet port, said drain port, said coaxial support coupling, said fixed internal element and said electromagnet means are positioned substantially axially with said outlet duct.

8. A valve in accordance with claim 1, wherein:

a body contains said on/off housing, said body also including hot and cold water inlets and flow regulation means for regulating a supply of water from said hot and cold water inlets to said supply duct, said body also including an electronic housing means for housing electronic components and an electric power supply which controls said electromagnet.

9. A valve in accordance with claim 1, wherein:

said on/off housing defines another outlet port communicating with said internal chamber;

another stop valve means is providing for opening and closing communication between said another said outlet port and said drain port.

10. A valve in accordance with claim 1, wherein:

sensor means are provided for controlling said electromagnet;

slider means are provided for positioning in front of and away from said sensor means.

11. A valve in accordance with claim 1, wherein:

a supply mouth for fluid exit from said on/off housing is positioned substantially coaxial with said outlet duct at one end of said outlet duct;

an axis of said supply mouth, said valve seat, said diaphragm valve, said stop valve means and said electromagnet means are positioned substantially axially aligned with an axial axis of said outlet duct and a direction of fluid exit from said on/off housing.

12. A valve in accordance with claim 1 wherein:

said diaphragm valve moves away from said valve seat on said inside of said outlet duct to cause communication between said supply duct and said outlet duct to pass between an outer radial surface of said diaphragm valve and said outer radial surface of said outlet duct.

13. A valve in accordance with claim 1, wherein:

said diaphragm valve has a substantially spherical shape.

14. An electronically controlled mixer valve comprising:

an on/off housing defining a supply duct and an outlet duct, the supply duct and outlet duct being in communication with each other, said housing including an outlet duct surface limiting an outer radial dimension of said outlet duct said outlet duct has an axial axis and has a supply mouth at one end substantially coaxial with said axial axis, for fluid exit from said on/off housing;

a valve seat having an annular shape and formed on said outlet duct surface;

a diaphragm valve positioned inside said outlet duct and surrounded by said annular shape of said valve seat, said diaphragm valve being formed of an elastic material, said diaphragm valve being positioned and having a shape to be capable of expanding to move an outer surface of said diaphragm valve against an inside of said annular shape of said valve seat in response to pressure differences between an inside and an outside of said shape, said diaphragm valve also being positioned and having a shape to be capable of contracting to move said outer surface of said diaphragm valve away from said inside of said annular shape of said valve seat in response to pressure differences between said inside and an outside of said shape, said diaphragm valve defining an internal chamber, said internal chamber communicating with said supply duct through a supply port;

an outlet port in communication with said internal chamber;

a drain port in communication with said outlet duct;

stop valve means positioned between said outlet port and said drain port, said stop valve means for opening and blocking communication between said outlet port and said drain port, said stop valve means blocking communication between said internal chamber and said drain port to expand said diaphragm valve against said valve seat and block communication between said supply duct and said outlet duct;

electromagnet means for controlling said stop valve;

a support coupling is positioned coaxially with said axial axis of said outlet duct and defining said drain port substantially axially with said axial axis of said outlet duct, said drain port having a supply end opposite said stop valve means, said supply end of said drain port being positioned adjacent said supply mouth, said coaxial support coupling also defining said outlet port substantially axially with said outlet duct; and a fixed internal element attached to said coaxial support coupling and said diaphragm valve, said diaphragm valve and said fixed internal element define said internal chamber, said diaphragm valve defines a radial opening as said supply port, said fixed internal element defines an opening communicating said internal chamber with said outlet port.

15. A valve in accordance with claim 14, wherein:

said outer surface of said diaphragm valve and said inside surface of said outlet duct define an annular passage for fluid flow when said diaphragm valve is positioned away from said valve seat, said annular passage surrounding said diaphragm valve;

said supply duct being positioned to be in direct communication with said annular passage.

16. A valve in accordance with claim 14, wherein:

said diaphragm valve has an annular shape with an inner radial side and an outer radial side, said outer radial side being contactable with an inner radial side of said valve seat;

said internal chamber is positioned inside an inner radial surface of said diaphragm valve.

17. A valve in accordance with claim 14, wherein:

an outer radial surface of said annular valve seat is connected to said housing.

* * * * *